(12) United States Patent
Pumm-Schubert

(10) Patent No.: US 11,141,826 B2
(45) Date of Patent: Oct. 12, 2021

(54) CENTERING INTERFACE OF A WORKPIECE CARRIER

(71) Applicants: KAPP NILES GmbH & Co. KG, Coburg (DE); KAPP NILES Metrology GmbH, Großostheim (DE)

(72) Inventor: Christfried Pumm-Schubert, Partenstein (DE)

(73) Assignees: KAPP NILES GmbH & Co. KG, Coburg (DE); KAPP NILES Metrology GmbH, Großostheim (DE)

( * ) Notice: Subject to any disclaimer, the term of this patent is extended or adjusted under 35 U.S.C. 154(b) by 188 days.

(21) Appl. No.: 16/561,481

(22) Filed: Sep. 5, 2019

(65) Prior Publication Data

US 2020/0078890 A1 Mar. 12, 2020

(30) Foreign Application Priority Data

Sep. 6, 2018 (DE) ...................... 10 2018 007 050.7

(51) Int. Cl.
*B23Q 3/18* (2006.01)
(52) U.S. Cl.
CPC .................................... *B23Q 3/183* (2013.01)
(58) Field of Classification Search
CPC . B23B 31/107; B23B 31/1071; B23Q 1/0072; B23Q 1/0063; B23Q 16/10; B23Q 3/106; B23Q 3/107; B23Q 3/108; B23Q 3/18; B23Q 3/183
See application file for complete search history.

(56) References Cited

U.S. PATENT DOCUMENTS

| 4,360,974 A | 11/1982 | Cuissart |  |
|---|---|---|---|
| 2006/0113732 A1* | 6/2006 | Hediger | B23Q 1/0072 279/19.3 |
| 2015/0054211 A1* | 2/2015 | Hediger | B23Q 1/0072 269/309 |

FOREIGN PATENT DOCUMENTS

| DE | 3043366 A1 | 5/1981 |
| DE | 3933887 A1 | 4/1991 |
| DE | 19514512 A1 | 10/1996 |
| DE | 10317339 A1 | 11/2004 |
| EP | 1640094 A1 | 3/2006 |
| EP | 1640094 B1 | 6/2007 |

* cited by examiner

*Primary Examiner* — Tyrone V Hall, Jr.
(74) *Attorney, Agent, or Firm* — Smartpat PLC

(57) ABSTRACT

A workpiece carrier consisting of a table adapter and a workpiece carrier base. The table adapter of the workpiece carrier is detachably mounted on a table of a measuring device or a machine tool. At least three different support points are arranged between the table adapter and the workpiece carrier base. A first support point comprises one rotary body and three balls. A second support point comprises a rotary body and two balls. A third support point comprises two contact elements. The table adapter and the workpiece carrier base can be clamped against each other after mutual positioning by means of a clamping system.

14 Claims, 6 Drawing Sheets

Fig. 1
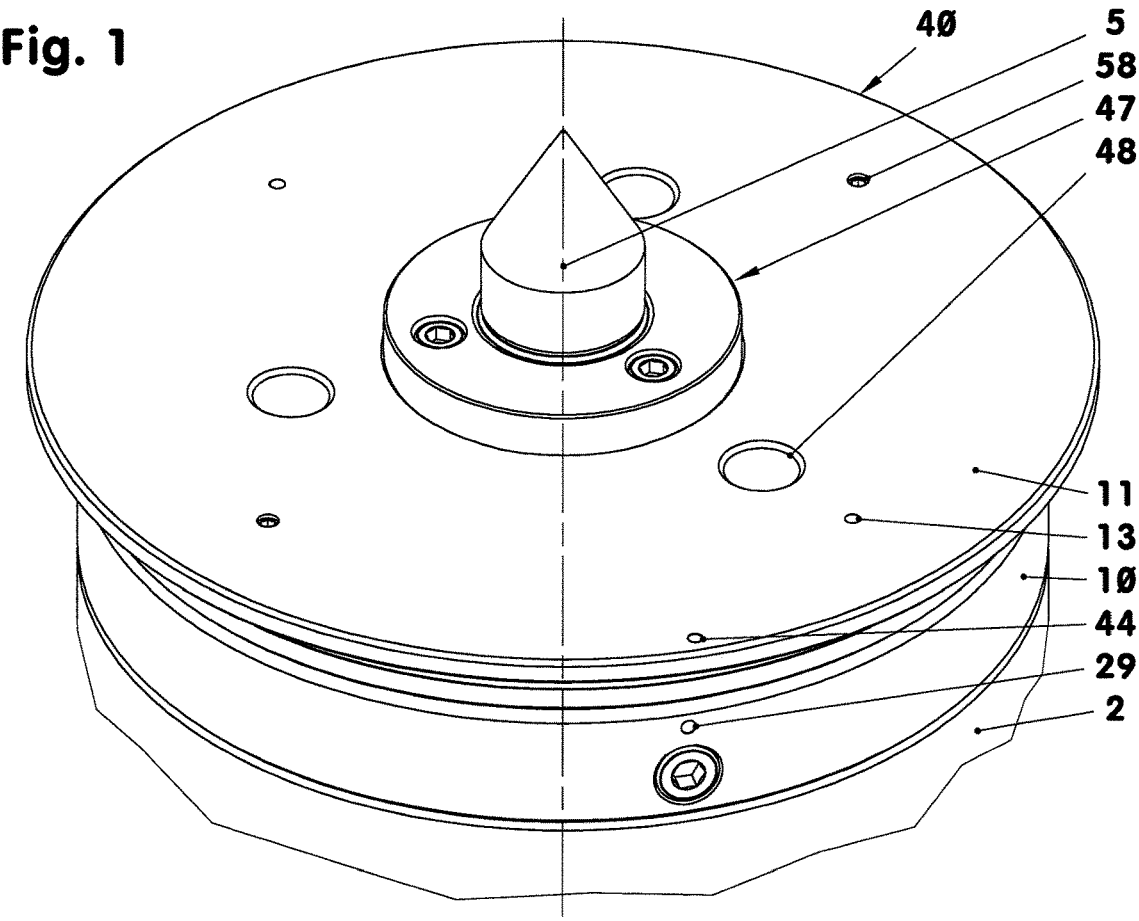
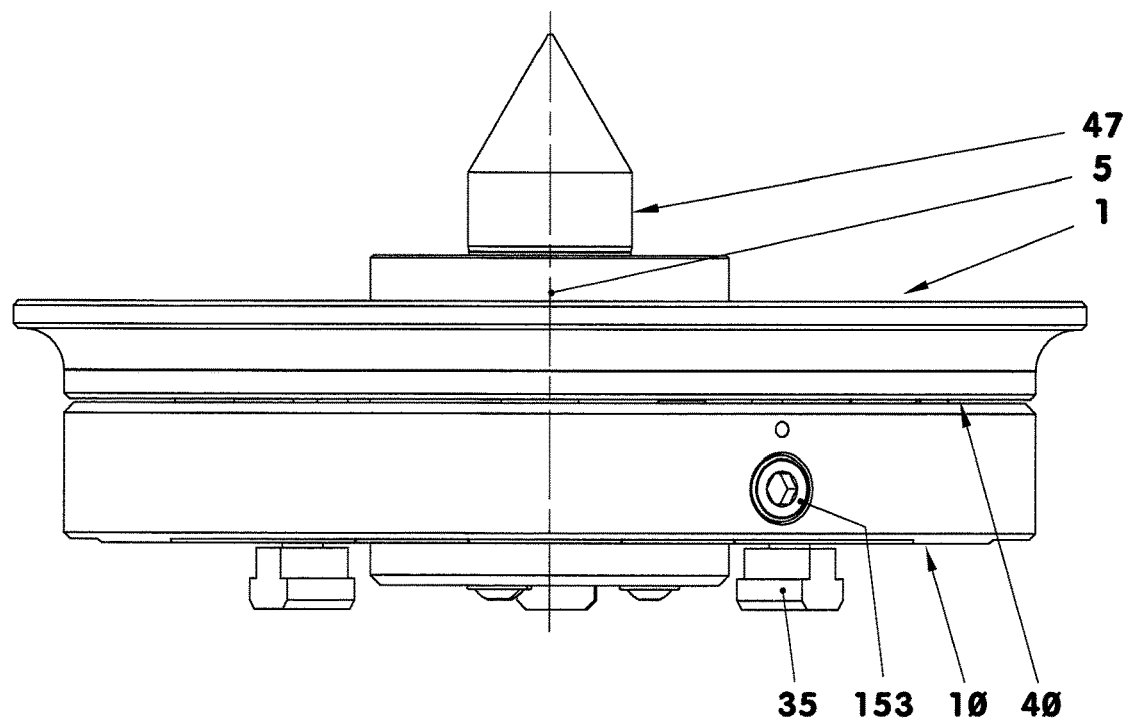
Fig. 2

Fig. 3
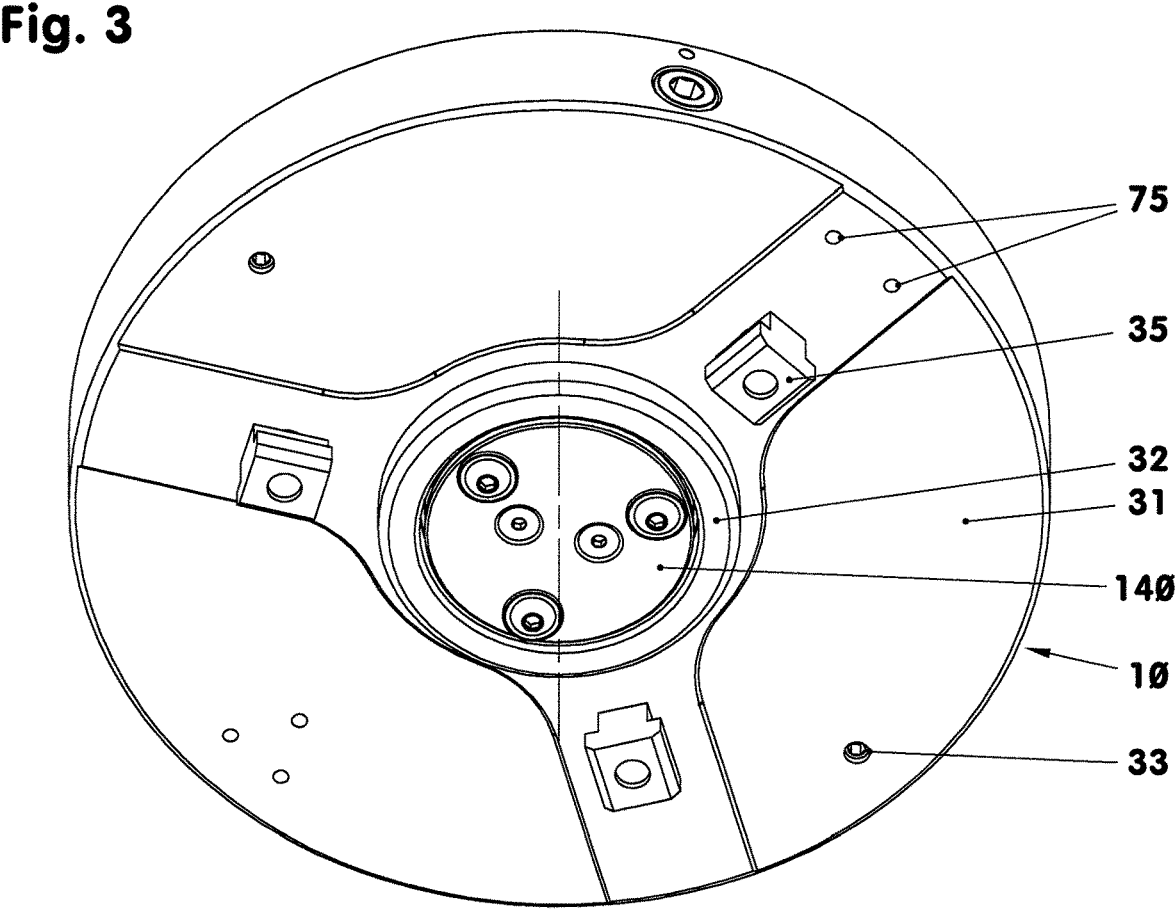
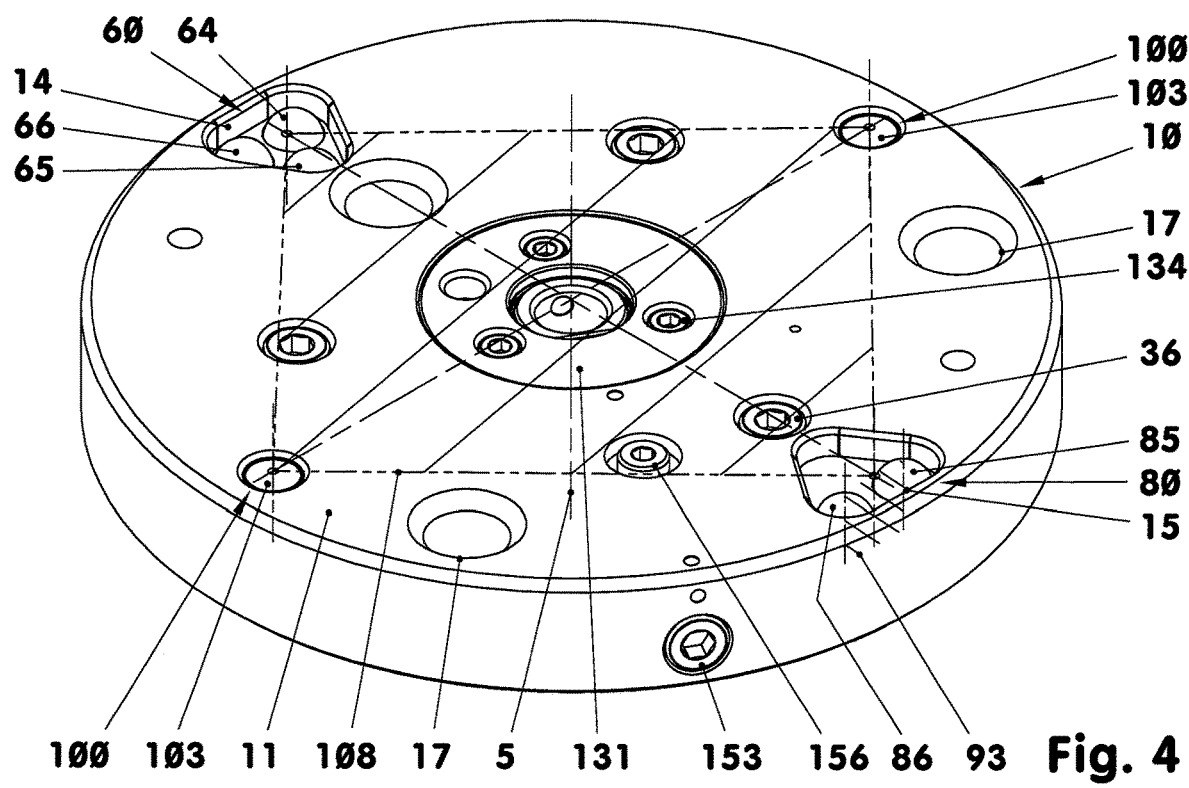
Fig. 4

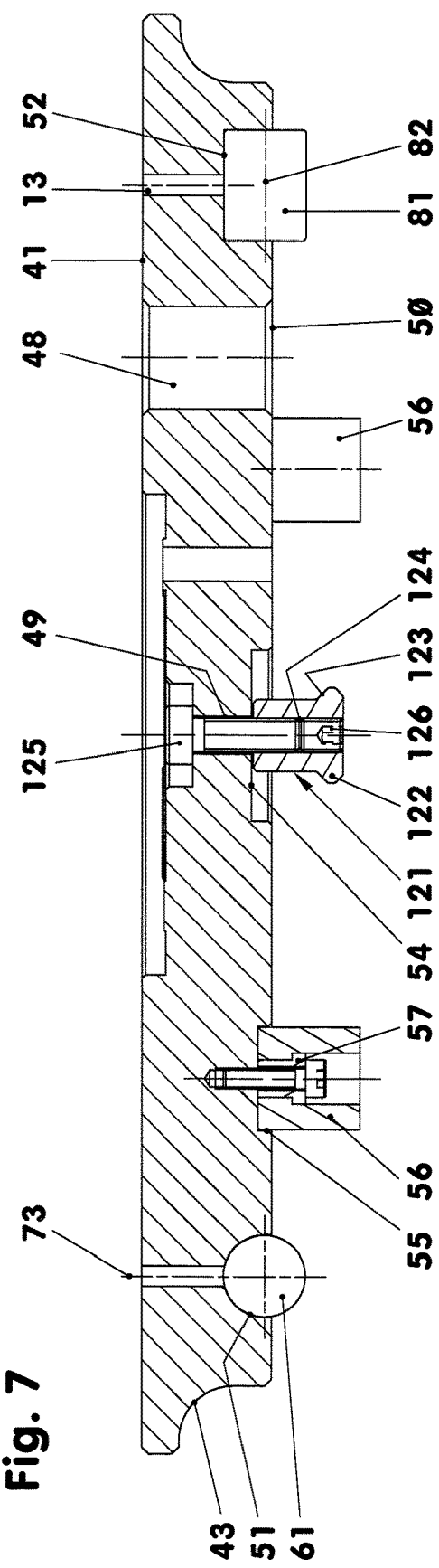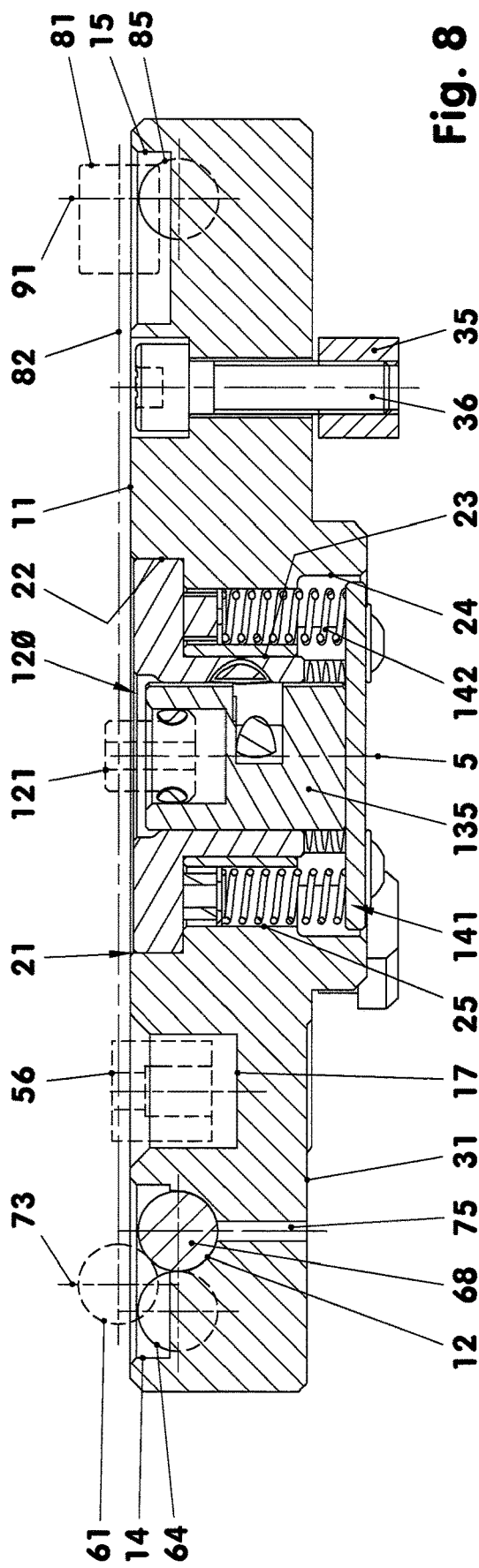

CENTERING INTERFACE OF A WORKPIECE CARRIER

TECHNICAL FIELD

The disclosure relates to a centering interface of a workpiece carrier consisting of a table adapter and a workpiece carrier base, wherein the table adapter of the workpiece carrier is detachably mounted on a table of a measuring device or a machine tool.

BACKGROUND

EP 1 640 094 B1 discloses a device for measuring a rotationally symmetrical precision part and a clamping device. Thereby, the precision part sits in a clamping chuck on an adapter. The adapter is mounted on a rotary table in a centered position. For this purpose, the adapter has three balls on its underside, which engage in three groove-shaped recesses of the rotary table.

The present disclosure is based on the problem of developing a centering interface for a workpiece carrier, which can be used to position a workpiece carrier base on a table adapter in a secure and time-saving manner with repeat accuracy.

SUMMARY

This problem is solved with the features as claimed. At least three different support points are arranged between the table adapter and the workpiece carrier base of the workpiece carrier. A first support point comprises a group consisting of a rotary body and three balls, which the rotary body contacts in three contact points, the center points of which form a triangle. A second support point comprises a group consisting of a rotary body and two balls. Thereby, the center point of the balls, together with the contact points located between the balls and the rotary body, form a plane that intersects the axis of rotation of the rotary body. A third support point comprises a group consisting of a contact element with a spatially curved front side and a contact element with a flat or spatially curved front side. Thereby, the two front sides contact each other. The first-mentioned component of each group is arranged on either the workpiece carrier base or on the table adapter. The table adapter and the workpiece carrier base can be clamped against each other after mutual positioning by a clamping system.

The workpiece carrier has a centering interface between a supporting table adapter and at least one supported tool carrier, which enables the individual tool carriers to be mounted onto the table adapter rapidly, securely and with repeat accuracy. Among other things, the tool carrier has the function of a pallet on which workpieces or other spatial bodies are picked up in advance or after the interface parts have been joined together. The workpieces can be inspected, measured or even machined on the workpiece carrier.

The centering interface is designed in such a manner that the individual tool carrier—or each tool carrier in a group—can be mounted on the table adapter in a single angular position. For this purpose, the centering interface has three different types of support points, each of which consists of a pair. If there are at least two types of support points, the pairing partners are not interchangeable. For example, in one type of support point, a ball is inserted into a depression between three balls arranged close to each other, while, with another type of support point, a horizontal cylinder is positioned between or on two balls that are likewise close to each other.

The types of support points, provided they are designated according to the number of contact points, form a group of four, a group of three and at least a group of two. Thereby, each pairing has a partner, which consists of only a single so-called "solo support element." The solo support elements of all groups can be arranged either on the underside of the tool carrier or on the upper side of the table adapter. It is also possible that one part of the solo support elements is attached to the table adapter and another part is attached to the tool carrier.

The table adapter is provided in the exemplary embodiment for a rotary table. However, with the aid of other fastening devices, it can also be adapted on the flat tabletop of a multi-coordinate measuring machine, on the machine bed, a stand or a carriage of a machine tool. Thereby, the workpiece carrier can be mounted upright or upside down with a vertical central axis. It is also possible to operate with the central axis aligned horizontally or, for example, at an angle of 45°.

Furthermore, it is conceivable that the table adapter and/or the tool carrier may have an outer contour deviating from the circular shape with respect to the respective cross-section—which is normal to the main center line of the workpiece carrier.

The following detailed description is merely exemplary in nature and is not intended to limit the invention or the application and uses of the invention. Furthermore, there is no intention to be bound by any theory presented in the preceding background or the following detailed description.

BRIEF DESCRIPTION OF THE DRAWINGS

FIG. 1 is a perspective view of a workpiece carrier mounted on a rotary table with a table spike.

FIG. 2 is a side view of the workpiece carrier according to FIG. 1.

FIG. 3 is a perspective view of the underside of the table adapter.

FIG. 4 is a perspective view of the upper side of the table adapter.

FIG. 7 shows a cut through the table adapter.

FIG. 8 shows a cut through the workpiece carrier base.

DETAILED DESCRIPTION

Figure 5:
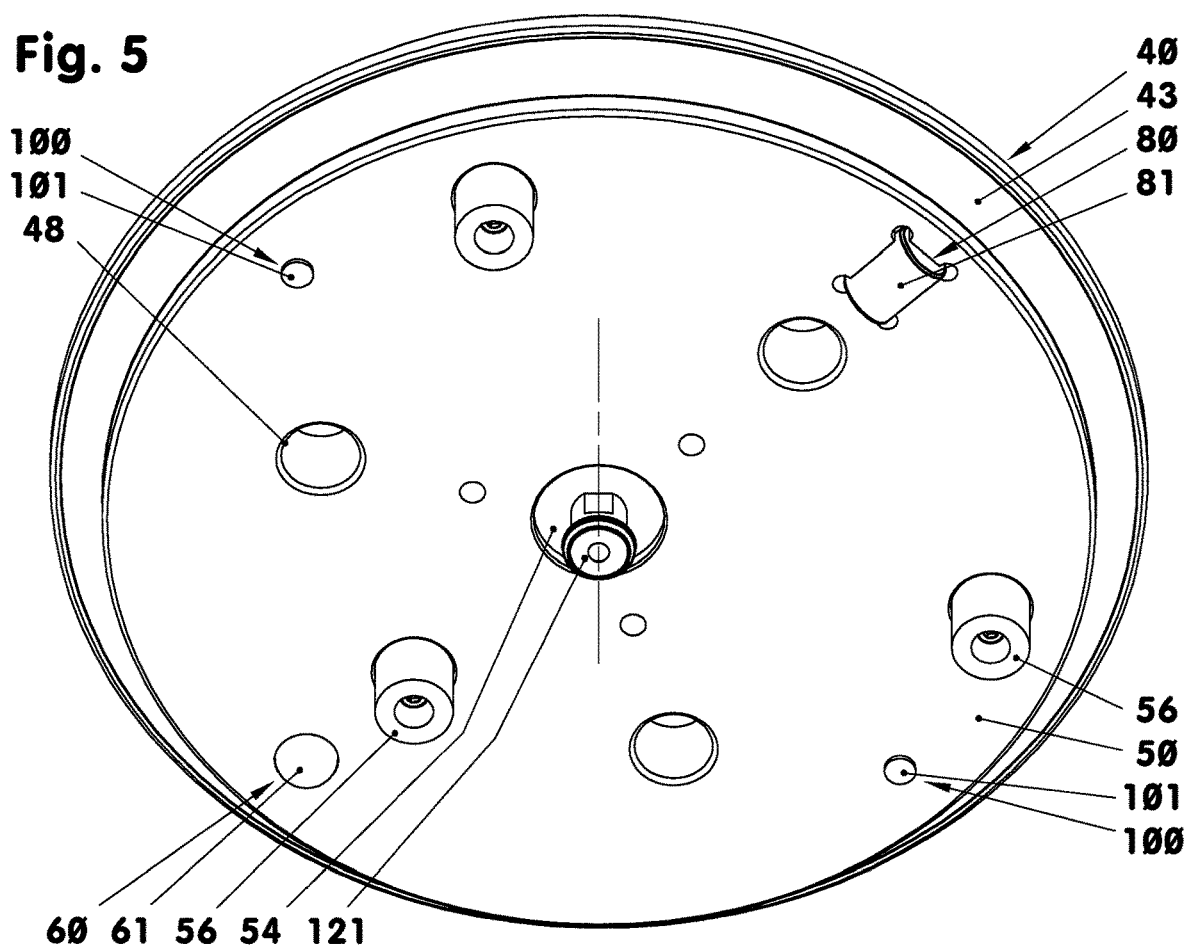
FIG. 5 is a perspective view of the underside of the workpiece carrier.

FIG. 1 shows a workpiece carrier (1) mounted on a rotary table (2). The rotary table (2) is arranged, for example, on the table of a multi-coordinate measuring machine or a machine tool. The workpiece carrier (1) essentially consists of two assemblies. The first assembly is a table adapter (10) that fixes the workpiece carrier (1) to the rotary table (2). The second assembly is the workpiece carrier base (40). A table spike (47) is centered on the workpiece carrier base (40) as part of a tool carrier. The latter can be replaced, for example, by a three-jaw chuck. Between the two assemblies, there are means for mutual centering and a clamping system (120).

FIGS. 3 and 4 show the essentially disk-shaped table adapter (10). The table adapter (10), which is made of (for example) the material X8CrNiS18-9, has a diameter of (for example) 190 mm with a disk height of (for example) 27 mm. On its underside (31), according to FIG. 3, it has (for example) a 8.5 mm high centering ring (32), which has a diameter of (for example) 70 mm. Outside the centering ring (32), three or more equidistantly divided T-slot nuts (35) are arranged on a pitch circle of (for example) 110 mm, which are held and fixed by screws (36) located in countersunk bores. In the edge area of the underside (31), there are—in relation to the main center line (5)—two adjusting threaded bores (33) opposite each other for receiving one adjusting threaded pin (34) each.

Between the upper side (11) of the table adapter (10) and the base underside (50) of the workpiece carrier base (40), there are four support points (60, 80, 100), of which only two (100) are of identical construction. In each support point (60, 80, 100), one support element (61, 81, 101) of the workpiece carrier base (40) contacts one (103), two (85, 86) or three support elements (64-66) of the table adapter (10).

On the upper side (11) of the table adapter (10), see FIG. 4, the parts on the table adapter side of the four support points (60, 80, 100) are located. The parts of the first support point (60), a so-called group of four, are three (for example) support elements in the form of balls (64-66) that are identical in terms of geometry and material. The center point of all three balls (64-66), for example, form an equilateral triangle, the side length of which measures (for example) 115.5% of the diameter of the balls (64-66). The mathematical center of gravity of the equilateral triangle is 79 mm from the main center line (5).

The parts on the table adapter side of the second support point (80), a so-called "group of three", are also two identical support elements of the same size in the form of balls (85, 86). The center point of both balls (85, 86) have a distance corresponding to 133.33% of the diameter of the individual balls (85, 86). The geometric center between the center point of the balls (85, 86) is 83 mm from the main center line (5).

The balls (67-69; 85, 86) of the first (60) and the second (80) support point have a diameter of (for example) 12 mm. All five balls (67-69; 85, 86) sit in ball bores (12), see FIG. 8, the bore bottom of which is spherically curved in a hemispherical shape. The bore diameter is (for example) 0.1 mm larger than the ball diameter. Each ball bore (12) leads into a dismantling bore (75), which has a diameter of (for example) 3 mm and ends at the underside (31).

The balls (67-69; 85, 86) are glued into the ball bores (12). Its center point is (for example) 7.2 mm from the upper side (11) of the table adapter (10). The balls of the first (60) and the second (80) support points are each located, for example, in a prismatic depression (14, 15), the depth of which corresponds, for example, to half the ball radius of the balls (67-69; 85, 86). The depressions (14, 15) have no effect on the positioning with repeat accuracy of the workpiece carrier base (40) on the table adapter (10). However, they protect the balls (67-69; 85, 86) from unwanted mechanical damage.

The lateral walls of the depressions (14, 15) are at least 1 mm from the walls of the ball bores (12). The depression (15) of the second support point (80) is based on an isosceles triangle, the height of which—measured parallel to the upper side (11)—measures (for example) 25.5 mm including radii.

Figure 18:
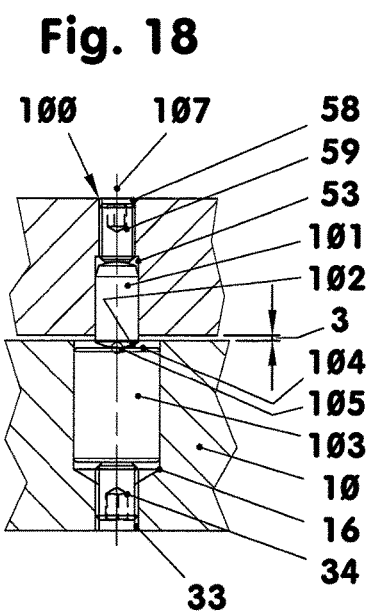
FIG. 18 shows a third support point with two pin-shaped and journal-shaped contact elements in a sectional view.
Figures 9, 14, 19:
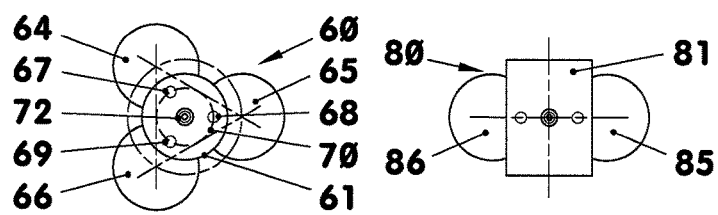
FIG. 9 shows a first support point with four balls in a top view.
FIG. 14 is a top view to FIG. 13.
FIG. 19 is a partial top view to FIG. 18.

Each of the parts on the table adapter side of the two third support points (100) of a so-called "group of two" is a contact element (103) in the form of a cylindrical journal of (for example) 12 mm diameter and (for example) an adjusting threaded pin (34), see FIGS. 18 and 19. Each cylinder journal (103) is located in a stepped bore (16) passing through the table adapter (10), the lower part of which is an adjusting threaded bore (33). In the cylindrical area of the stepped bore (16), which is (for example) 2 mm longer than the length of the cylinder journal (103), the respective cylinder journal (103) sits over a longitudinal press fit. The distance between the front side of the cylinder journal (103) closest to the upper side (11) is adjusted with respect to the underside (31) by the adjusting threaded pin (34) located below it in the adjusting threaded bore (33). In the exemplary embodiment, this distance amounts to 1 mm. If necessary, the position of the threaded pin (34) is secured with an adhesive.

The center lines (107) of the contact elements or cylinder journals (103) are located together with the main center line (5) in a first plane, which vertically intersects a second plane, which is spanned by the main center line (5) and the connecting line of the centers (72, 89) of the first (60) and the second (80) support point.

The projections of the centers (72, 89) on the upper side (11) and the center lines (107) of the contact elements (101, 103) of the third support points (100) intersect the plane of the upper side (11) at four points that form the corners of a kite quadrilateral (108), through which the workpiece carrier (1) is supported on the table adapter (10). The kite quadrilateral (108) has an area, hatched in FIG. 4, that corresponds to 46.56% of the circular area whose radius is the largest radius of the table adapter (10). For workpiece carriers of different sizes, such area percentage is usually 49±7%. In place of the kite quadrilateral (108), the quadrilateral can also be a square, a rectangle, a diamond, a parallelogram, a trapezoid or the like.

Three blind holes are arranged in the upper side (11) of the table adapter (10) as pre-centering recesses (17). The (for example) 16 mm deep blind holes (17) have a diameter of (for example) 17 mm. They end in the upper side (11), each with a 3×45° bevel. The pitch of the pre-centering recesses (17) amounts to 120 angular degrees. A pre-centering recess is located in the plane spanned by the center lines (73, 91) of the centers (72, 89). Its center line is (for example) 50 mm from the main center line (5). The two other pre-centering recesses are at a distance of (for example) 77.5 mm relative to the main center line (5).

As shown in FIG. 8, the table adapter (10) has a triple-stepped through bore (21) in its center, extending from the upper side (11) to the underside (31). The through bore (21), in which parts of a clamping system (120) are arranged, consists of a centering zone (22), a central zone (23) and a stroke zone (24). The 8 mm deep centering zone (22) has a diameter of 59 mm. With a diameter of 54 mm, the stroke zone (24) incorporated from the underside (31) has a depth of 10.5 mm. The central zone (23) located between the centering zone (22) and the stroke zone (24) has a diameter of 26 mm. Around the stroke zone (24), at a diameter of (for example) 28 mm, six spring guide bores (25) are arranged in pairs, each with a diameter of 9 mm. Between two spring guide bores (25) of a pair, there is one M5 threaded bore (26) each.

Figure 20:
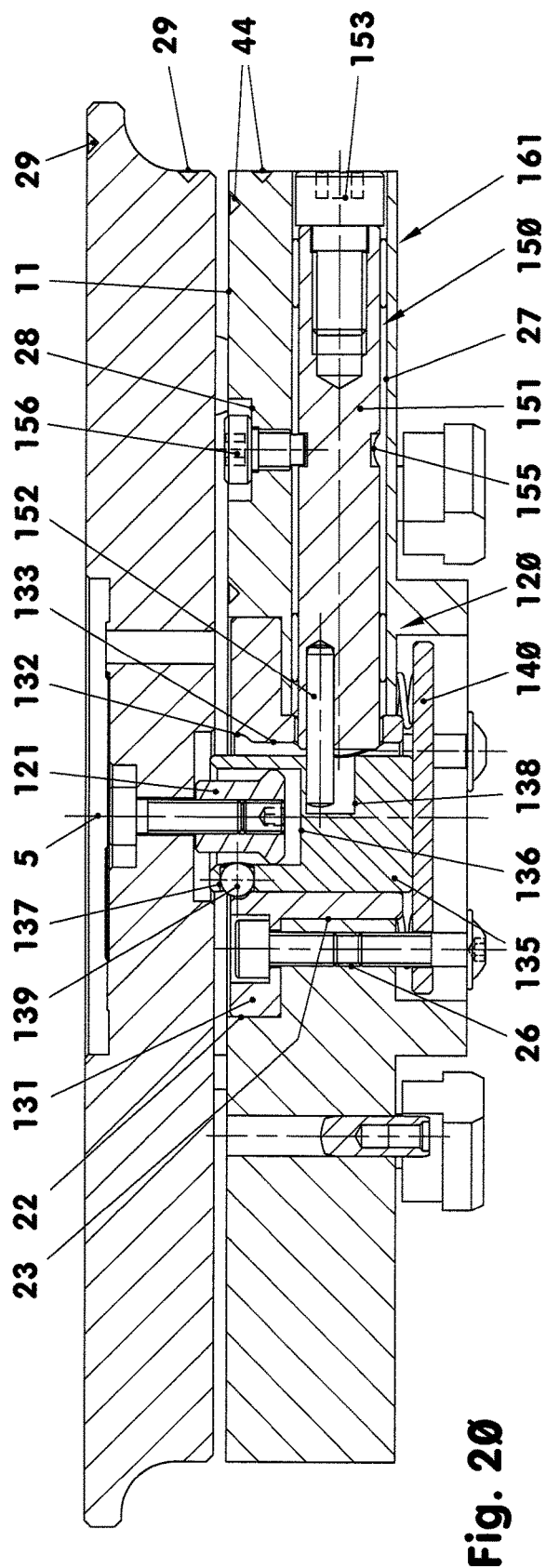
FIG. 20 shows a cut through the workpiece carrier with the workpiece carrier base on top and an overtensioned spring mechanism.

According to FIG. 20, there is a radial bore (27) in the table adapter (10), which cuts the central zone (23) in the middle. The radial bore (27) has a diameter of (for example) 14 mm. In the upper side (11) there is a stop countersunk bore (28) transverse to the radial bore (27) for receiving a stop screw (156).

There is a small marking bore (44) between the radial bore (27) and the upper side (11) of the table adapter (10). Two additional marking bores are located on the upper side (11), each in the immediate vicinity of the outer edge of the table adapter (10) and in the vicinity of the centering zone (22). All three marking bores are located in the plane in which the main center line (5) and the center line of the radial bore (27) are located.

Figure 6:
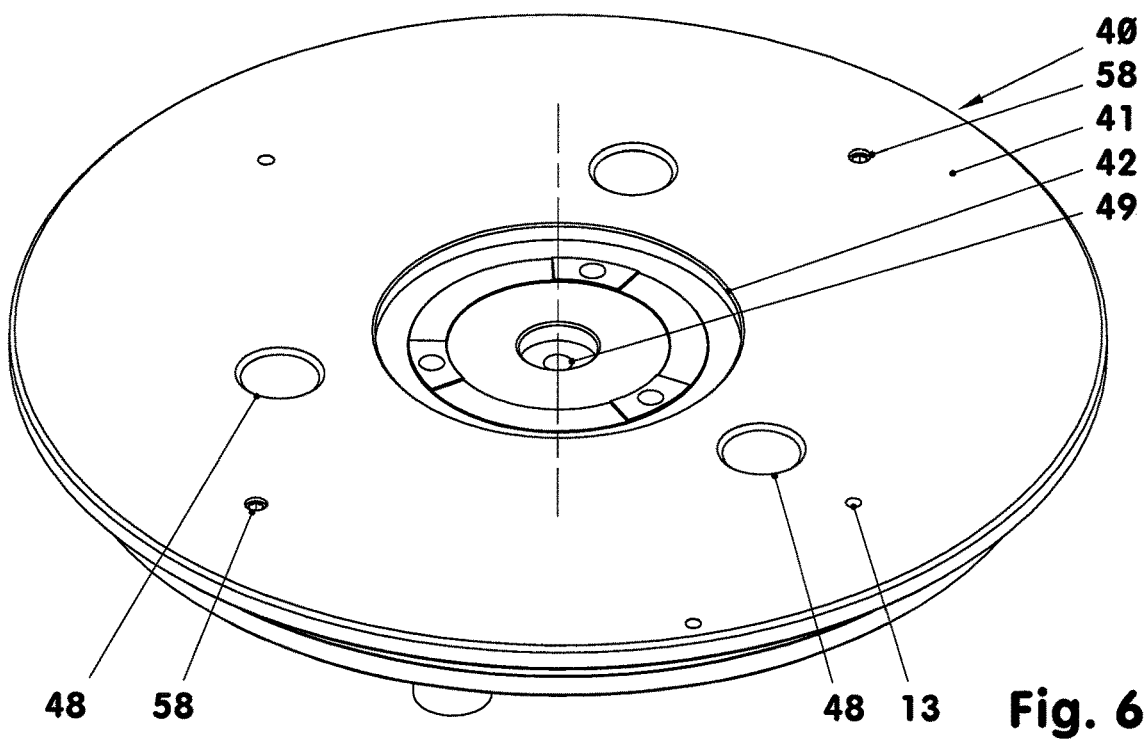
FIG. 6 is a perspective view of the upper side of the workpiece carrier with the tightening bolt not mounted.

FIGS. 5 and 6 show two views of the workpiece carrier base (40) without the table spike (47) attached. The workpiece carrier base (40) made of an aluminum-silicon alloy is essentially in the form of a disk, which is for example 19 mm thick, the maximum diameter of which amounts to 210 mm. Its surface is hard anodized at least in certain areas. The workpiece carrier base (40) is equipped with a flange-like rear grip edge (43) that protrudes by, for example, 10 mm. The rear grip edge (43), which, for example, merges with an 8 mm radius into the cylindrical area of the radial outer wall, the diameter of which amounts to 190 mm, is equipped with a surface structure to improve haptics, where necessary.

A centering recess (42) for receiving the table spike (47) or a multi jaw chuck is incorporated into the center of the base upper side (41). In the center of the centering recess (42), there is a bearing bore (49) as a seat for a traction bolt (125) for mounting a tightening bolt (121) on the workpiece carrier base (40). The centering recess (42) also has three more threaded bores, for example, which are used to fix the table spike (47) or the multi jaw chuck on the workpiece carrier base (40).

Three or more mounting bores (48) with a diameter of (for example) 15 mm are arranged at an equidistant pitch around the centering recess (42), through which—with a mounted workpiece carrier (1)—the T-slot nuts (35) can be accessed by screws (36) fixing the T-slot nuts (35) to the table (2), see FIGS. 5-8. Two calibrating threaded bores (58) are provided in the vicinity of the outer edge of the workpiece carrier base (40) for receiving the calibrating threaded pins (59), see FIG. 18.

The base underside (50) has a (for example) 3 mm deep clamping countersink (54) in the middle, the diameter of which amounts to (for example) 25 mm, and in which the tightening bolt (121) is mounted in the middle by means of the traction bolt (125).

Three essentially cylindrical pre-centering journals (56) are arranged on n the base underside (50), see FIGS. 5 and 7. A hollow metallic fixing core (57), through which the individual pre-centering journal (56) is fastened to the workpiece carrier base (40) by a screw, is seated in the respective stepped bore of the individual pre-centering journal (56). The pre-centering journals (56), which here have a diameter of 15 mm, are made of transparent polyethylene with a Shore hardness of 75 A, for example. In the base underside (50), they are each seated in (for example) 2 mm deep pre-centering countersinks (55). The free ends of the pre-centering journals (56) project beyond the base underside (50) by (for example) 13 mm. Thus, they constitute contact support during stacking and storage. At the same time, they protect the ball (61), the cylinder (81) and the two cylindrical pins (101) from shock-induced damage or misalignment.

The center lines of the pre-centering journals (56) are aligned—after placing them on the table adapter (10)—with the center lines of the pre-centering recesses (17) of the table adapter (10).

The support elements (61, 81, 101) of the three different support points (60, 80, 100) protrude from the base underside (50), see FIGS. 5 and 7. The base underside part of the first support point (60) is a ball (61) as a rotary body. It is glued into a ball bore (51), see also FIG. 7. The shape of the ball bore (51) largely corresponds to the shape of the ball bores (12) of the table adapter (10).

The base underside part of the second support point (80) is also a rotary body, which here is designed as a cylinder (81). The cylinder (81), for example a rolling bearing body, sits in a channel-shaped bearing recess (52) with flat front surfaces. Thereby, the center line (82) of the cylinder (81) is oriented in a manner parallel to the base underside (50). Its distance to the base underside (50) amounts to (for example) 1 mm. In the workpiece carrier base (40), the ball (61) and the cylinder (81) have a diameter of (for example) 12 mm. In the exemplary embodiment, the center line (82) of the cylinder (81) intersects the main center line (5) and the center of the ball (61) of the first support point (60).

All balls (61, 67-69; 85, 86) and the cylinder (81) are made of (for example) chrome steel 100Cr6. The balls (61, 67-69; 85, 86) can also be half-balls or ball sections.

The two contact elements (101) of the third support points (100) also protrude from the base underside (50), see FIGS. 5 and 18. Each contact element here is a cylindrical pin (101) with a diameter of (for example) 6 mm and a length of (for example) 12 mm. The front surface (102) protruding from the base underside (50) is spherically curved. The curvature has a radius of (for example) 6 mm. The cylindrical pin (101) sits in the cylindrical area of the stepped bore (53) by a longitudinal press fit. For example, a calibrating threaded pin (59) with a hexagon socket is screwed into the calibrating threaded bore (58) adjacent to the cylindrical area.

If necessary, such contact element (101) can also have a flat front surface if, by suitable measures, it is mounted in an articulated manner in its bearing position, so that an edge support cannot form between it and the contact element (103) located opposite to it in each case.

Figure 10:
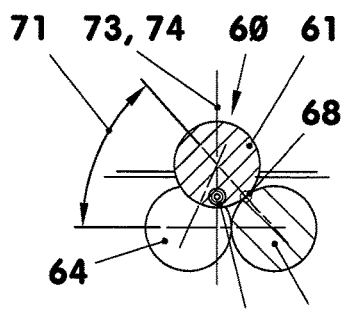
FIG. 10 shows a central cut through the side view according to FIG. 9.

In the first support point (60), the spherical rotary body (61) of the tool carrier base (40) is located on the three balls (64-66) of the table adapter (10), see FIGS. 8, 9 and 10. The four balls (61, 64-66) have three common contact points (67-69). These are theoretically point contacts. In practice, however, due to the elastic deformation of the balls, they are small circular areas. The mutual connecting lines of the center point of all balls (61, 64-66) form a straight pyramid with the base of an equilateral triangle. The height of the pyramid is smaller than the height of a regular tetrahedron. The lateral edges of the pyramid, which are not oriented in a manner parallel to the upper side (11), are inclined to the upper side (11), for example by 48.19 angular degrees. Such angle of inclination (71) can vary between 20 and 70 angular degrees. The center of the group of four (72) is located in the center of gravity of the triangle, the corners of which represent the point contacts (67-69).

Figure 13:
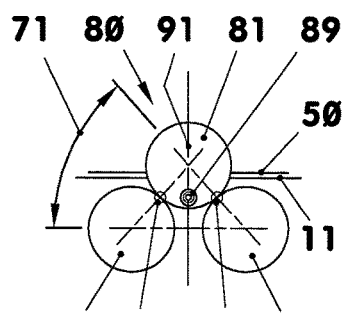
FIG. 13 shows a second support point with two balls and a cylinder in a side view.

In the second support point (80), the cylinder (81) of the tool carrier base (40) sits on the two balls (85, 86) of the table adapter (10), see FIGS. 8, 13 and 14.

The center point of the balls (85, 86), together with the contact points (87, 88) located between the balls (85, 86) and the cylinder (81), form a plane (93), see FIG. 4, which vertically intersects the cylinder center line (82) of the cylindrical rotary body (81). The center point of the balls (85, 86) and the interface of the cylinder center line (82) with the plane (93) form an isosceles triangle. The two triangular legs, the length of which corresponds to the diameter of one of the balls (85, 86), adopt an angle of inclination (71) with respect to the upper side (11) that corresponds to the angle of inclination (71) known from the first support point (60).

The contact points (87, 88), which are theoretically also point contacts, have the surface of an ellipse, wherein the large semi-axis of the ellipse is oriented parallel to the cylinder center line (82). The geometric center between the point contacts (87, 88) represents the center of the group of three (89).

In the first support point (60), through the contact of the spherical rotary body (61) with the three balls (64-66), all three degrees of translational freedom for the spherical rotary body (61) are blocked. Accordingly, the rotary body (61) with the workpiece carrier base (40) can only move around its rotary body center of rotation with three degrees of swivel freedom.

As soon as the cylinder (81) of the second support point (80) contacts the two balls (85, 86) on the table adapter side, the material carrier base (40) has only one degree of swivel freedom. It can swivel back and forth at a small angle around the cylinder center line (82). This degree of swivel freedom is blocked by the two third support points (100).

The two contact elements (101) of the third support point (100) are adjusted—after the workpiece carrier base (40) has been placed on the table adapter (10) and the clamping system (120) has been actuated to develop a clamping force—by adjusting the two calibrating threaded pins (59) with the aid of suitable measuring equipment, e.g. a master part or a reference part.

Figure 12:
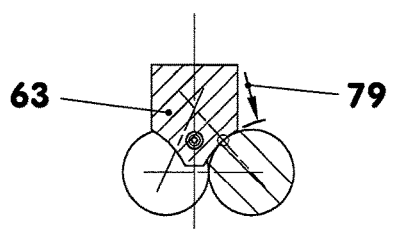
FIG. 12 is a view as in FIG. 10, but with a hollow taper pin as the support element.
Figure 11:
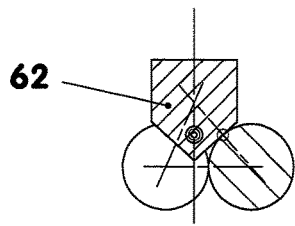
FIG. 11 is a view as in FIG. 10, but with a taper pin as the support element.

FIGS. 11 and 12 show two variants of the embodiment according to FIG. 10 for the rotary body of the first support point (60). According to FIG. 11, the rotary body is a taper pin (62). It consists of a cone with a point angle of (for example) 96.38 angular degrees and a shaft. The shaft is glued into a corresponding bore in the workpiece carrier base (40) or is seated there, for example by means of a press fit.

According to FIG. 12, the rotary body is a hollow taper pin (63). In such a case, the cone from FIG. 11 is replaced by a hollow truncated cone, the concave curvature of which is a partial surface of a torus whose smallest cross-section has a radius (79) equal to the diameter of the balls (64-66). The maximum outer diameter of the torus measures four times the diameter of the balls (64-66). In such a case, the contact conditions are the same as in FIG. 11, but with the difference that, due to the concave clinging of the hollow taper pin (63) to the balls (64-66), the surface pressure in the contact points is lower than in the variants according to FIGS. 10 and 11.

The axis of rotation of the taper pin (62) or hollow taper pin (63) is oriented perpendicular to the base underside (50). Such rotation bodies (62, 63) can also be each a ball section, a truncated cone, a truncated rotational paraboloid or the like. It is also possible that the balls (61, 67-69; 85, 86) used in the support points (60, 80) may have different diameters within the individual support points.

Figure 15:
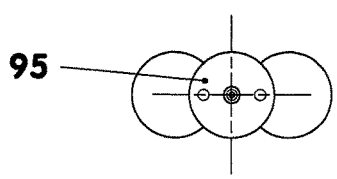
FIG. 15 shows a second support point with three balls in a top view.
Figures 16, 17:
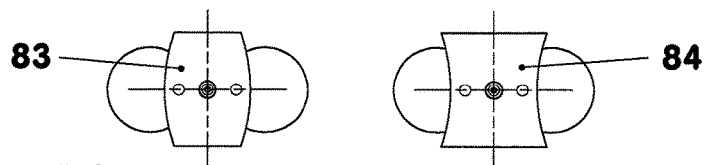
FIG. 16 shows a second support point with two balls and one drum in a top view.
FIG. 17 is a view as in FIG. 16, but with a hollow roll.

FIGS. 15-17 show variants of the rotary body on the base underside for the second support point (80). According to FIG. 15, the latter is a ball (95), according to FIG. 16, a drum (83) and according to FIG. 17, a hollow roll (84). Rotary bodies in the form of a truncated cone, an ellipsoid, a hyperboloid or the like are also conceivable. With FIGS. 16 and 17, the respective contact circle has the same diameter as the cylinder (81) according to FIG. 14. The radii of curvature, which determine the drum and hollow roll contours, have a radius of (for example) 24 mm.

Figure 21:
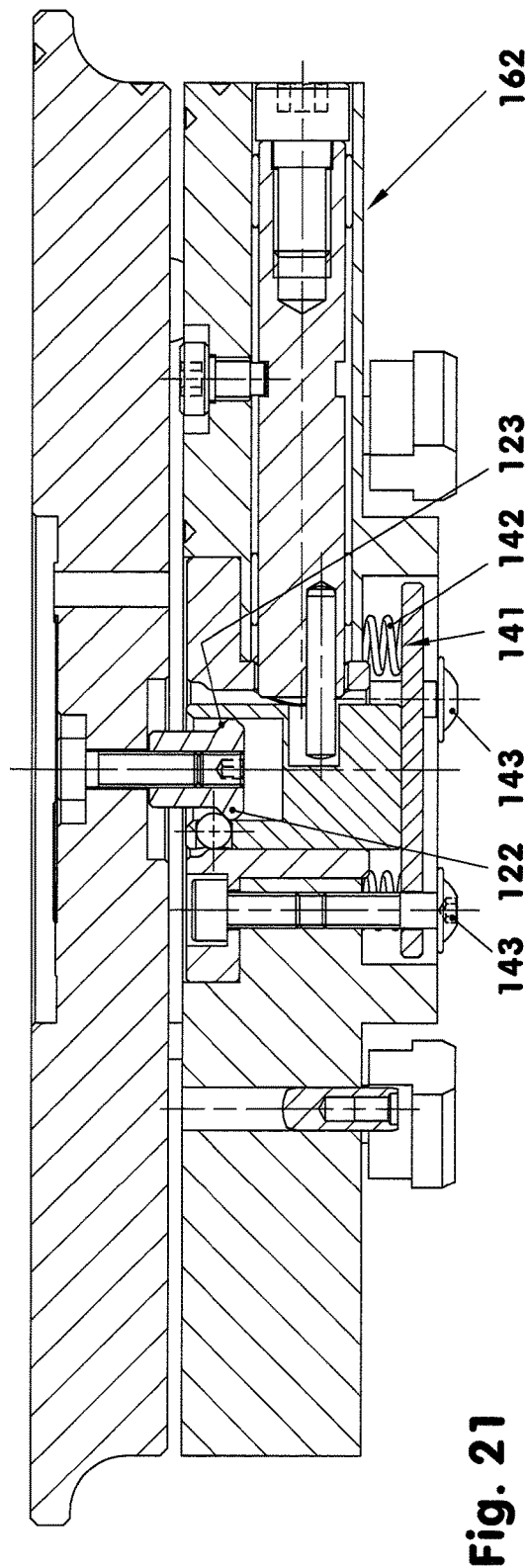
FIG. 21 is an illustration as FIG. 20, but with a fixed workpiece carrier base and an unloaded eccentric drive.

FIGS. 20 and 21 each show a section through the clamping system (120) of the centering interface. Further details can also be found in FIGS. 7 and 8. FIG. 8 thereby shows the clamping system with a minimally loaded or minimally pre-tensioned spring mechanism (141).

The clamping system (120), most of the parts of which are accommodated or mounted in the table adapter (10), essentially consists of a tension pin (135) movable along the main center line (5), which—controlled by an eccentric drive (150)—pulls the tightening bolt (121) of the workpiece carrier base (40) into the table adapter (10) in a spring-loaded manner.

In a first approximation, the tightening bolt (121), see FIGS. 5 and 7, is a cylindrical tube with an internal thread (124). At its free end, the tube carries a circulating bar (122) with, for example, an almost trapezoidal cross-section. The circulating bar (122) has a wide 45° bevel towards the front side of the tube. An additional 45° bevel is formed on the rear side of the circulating bar (122) as a rear grip shoulder (123). In the tube area, the tightening bolt (121) may be formed as a double flat, see FIG. 5. The tightening bolt (121) sits with an axial and radial clearance of 0.1 mm (for example) in each case in the bearing bore (49) that is equipped with a cylinder countersink in the center of the centering recess (42), see also FIG. 6. The axial and radial clearance prevents constraining forces that—when clamping the workpiece carrier base (40)—have a retroactive effect especially on the support points (60) and (80).

A traction bolt (125) absorbing the total clamping force is screwed into the internal thread (124) of the traction bolt (121) and is locked by means of a secured threaded pin (126), see FIG. 7.

The tension pin (135), see FIG. 20, is essentially a cylindrical rotary body with an outside diameter of (for example) 22 mm, which is flattened in the sheath area towards the eccentric drive (150) at least in certain areas. The tension pin (135) has an axial main bore (136) for receiving the tightening bolt (121). The inner diameter of the main bore (136) is at least 0.2 mm larger than the maximum outer diameter of the tightening bolt (121) in the area of the circulating bar (122). Transverse to the main bore (136), it has, for example, three equidistantly divided, radially oriented transverse bores (137), in each of which a locking ball (139) is radially mounted in a displaceable manner. Below the bottom of the main bore (136), the tension pin (135) has an actuating groove (138), the depth of which extends to the center of the tension pin (135).

According to FIGS. 8, 20 and 21, a (for example) 3.2 mm thick tension pin carrier plate (140) with a diameter of (for example) 52 mm is arranged on the underside of the tension pin (135). The tension pin carrier plate (140), see also FIG. 3, has, for example, five bores. It is screwed to the tension pin (135) via the two internal bores. The three external bores are used via the support screws (143) to guide the tension pin carrier plate (140) on the table adapter in the space of the stroke zone (24).

The tension pin (135) itself is guided in a flange-like guide sleeve (131) with central sliding bearings in the locking bore (133). The guide sleeve (131) sits in a centered position for this purpose and screwed into the M5 threaded bores (26) by means of the screws (134) in the centering zone (22) of the through bore (21). Towards the upper flange-side end of the guide sleeve (131), the locking bore (133) merges in an edge-free manner into a short storage space bore (132) via a smoothed and rounded truncated cone-shaped transition.

The six pre-tensioned helical compression springs (142) of the spring mechanism (141) are supported by their lower end on the tension pin carrier plate (140). The helical compression springs (142) are guided into the spring guide bores (25) of the table adapter (10). The upper ends of the helical compression springs (142), see FIG. 8, each contact the underside of the flange of the guide sleeve (131). In the exemplary embodiment, a spacer sleeve and a washer are inserted between the upper spring ends and the flange—to adjust the spring pre-tensioning.

According to FIGS. 20 and 21, the actuating shaft (151) of the eccentric drive (150) is mounted in the radial bore (27) of the table adapter, via (for example) two slide bearing sleeves. An actuating pin (152) is pressed eccentrically into a longitudinal bore in the front side of the actuating shaft (151) closest to the main center line (5).

In order to be able to drive the actuating shaft (151), there is a central threaded bore in its other front side in which, for example, an M8 cylinder head screw according to DIN 912 is screwed in and glued in as an actuating screw (153). To secure the actuating shaft (151) in an axial manner, a stop groove (155) in the form of a slot is milled into it approximately in the middle of the circumference. The stop groove (155) extends —without its two semi-cylindrical ends— over, for example, 182 angular degrees of the circumference of the actuating shaft (151). The cylindrical pin of a stop screw (156) projects into the stop groove (155) with an axial clearance of (for example) 0.3 mm.

The manually operated mechanical clamping system (120) can also be operated via other gears or other drives instead of the eccentric drive (150). Pneumatic, hydraulic or electromechanical drives are conceivable. Furthermore, the end positions of the swivel positions of the actuating shaft (151) can be monitored by sensors. For example, the magnetic field of a magnet embedded in the actuating shaft can, in at least one of the end positions, cause a Hall sensor mounted on the table adapter (10) to emit an electronically evaluable signal that, for example via battery-backed electronics, enables an optical or acoustic indication.

Before joining the centering interface, the tension pin (135) of the clamping system (120) is brought into its release position (161), see FIG. 20. For this purpose, with a left-hand rotation of the actuating screw (153), the tension pin (135) is moved in the direction of the upper side (11) of the workpiece carrier base (40) by means of the actuating pin (152), under further pre-tensioning of the spring mechanism (141). The tension pin (135) now protrudes—as is clearly visible—2-3 mm above the upper side (11) of the table adapter (10). During the stroke of the tension pin (135), the locking balls (139), guided by the transverse bores (137), enter the area of the storage space bore (132) of the guide sleeve (131). In this position, the locking balls (139) can move radially outwards until the cross-section of the storage space bore (132) is completely free.

For fixing the workpiece carrier base (40), equipped with its table spike (47) or a jaw chuck, on the table adapter (10), the workpiece carrier base (40) is placed on the table adapter (10) with the pre-centering journal (56) in front. Thereby, the pre-centering journals (56)—anticipating the rotary bodies (61, 81) and the cylindrical pins (101) —plunge into the pre-centering recesses (17), see FIG. 8. In FIG. 8, one of the pre-centering journals (56), together with the rotary bodies (61, 81) and the tightening bolt (121), is shown dashed in the interface end position, which corresponds to the joined centering interface.

In order to accelerate positioning—when the workpiece carrier base is placed manually—care is taken that the marking bores (44) of the workpiece carrier base (40) and the marking bores (29) of the table adapter (10) are close to each other.

After a proper support of the workpiece carrier base (40) on the table adapter (10) has been achieved, the gap (3) between the base underside (50) and the upper side (11) is (for example) 0.74 mm, the tightening bolt (121) fastened to the workpiece carrier base (40) projects deep into the main bore (136) of the tension pin (135). The circulating bar (122) of the tightening bolt (121) is now positioned below the locking balls (139). With a clockwise rotation of the actuating shaft (151) over the actuating screw (153), the actuating pin (152) releases the spring mechanism (141), such that the tensioned helical compression springs (142) pull the tension pin (135) downwards over the tension pin carrier plate (140) as shown in FIG. 21. Thereby, the locking balls (139) have been applied to the rear grip shoulder (123) of the tightening bolt (121) and, with this, have pulled the workpiece carrier base (40) against the table adapter (10). The workpiece carrier (1) is now in the clamping position (162).

The spring mechanism (141) releases a clamping force of (for example) 200 N, wherein the workpiece carrier base (40), due to the choice of material and its wall thickness—elastically deformed in the range of hundredths of millimeters—is applied over its support points (60, 80, 100) to the table adapter (10) in a manner statically overdetermined. Thereby, the base upper side (41) is concave and rotationally symmetrical to the main center line (5).

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

LIST OF REFERENCE SIGNS

1 Workpiece carrier
2 Table, rotary table
3 Gap between (10) and (40)
5 Main center line, center axis
10 Table adapter
11 Upper side
12 Ball bores
13 Dismantling bores
14, 15 Depressions for the balls (64-66, 85, 86)
16 Stepped bore
17 Pre-centering recesses, blind bores
21 Through bore
22 Centering zone 23 Central zone
24 Stroke zone
25 Spring guide bores
26 M5 threaded bore
27 Radial bore
28 Stop countersink bore
29 Marking bores of (10)
31 Underside
32 Centering ring
33 Adjusting threaded bores
34 Adjusting threaded pin
35 T-slot nuts
36 Screws
40 Workpiece carrier base, pallet; workpiece carrier
41 Base upper side
42 Centering recess
43 Rear grip edge
44 Marking bores of (40)
47 Table spike or three-jaw chuck; workpiece carrier
48 Mounting bores
49 Bearing bore
50 Base underside
51 Ball bore
52 Bearing recess
53 Stepped bore
54 Clamping countersink
55 Pre-centering countersinks
56 Pre-centering journal
57 Fixing core
58 Calibrating threaded bores
59 Calibrating threaded pins
60 First support point, group of four
61 Ball, first rotary body, support element, component, top
62 Taper pin, rotary body, support element, top
63 Hollow taper pin, rotary body, support element, top
64-66 Balls, support elements, table adapter side
67-69 Contact points, round point contact
70 Contact point circuit, circuit
71 Angle of inclination
72 Center of group of four, center
73 Center line of the first support point
74 Axis of rotation, vertical
75 Dismantling bores
79 Radius for (63)
80 Second support point, group of three
81 Cylinder, second rotary body, support element, component, top
82 Cylinder center line, center line, axis of rotation
83 Drum, rotary body, top
84 Hollow roll, rotary body, top
85, 86 Balls, table adapter side; support elements
87, 88 Contact points, elliptical point contacts
89 Center of group of three, center
91 Center line of the second support point
93 Level
95 Ball
100 Third support point, group of two
101 Contact element, top; cylindrical pin, support element, component
102 Front surface, spherical
103 Contact element, table adapter side; cylinder journal, support elements
104 Front surface, flat or spatially curved
105 Contact points, round point contact, center of group of two
107 Center line of the third support point
108 Kite quadrilateral, quadrilateral
120 Clamping system
121 Tightening bolt on (40)
122 Circulating bar
123 Rear grip shoulder
124 Internal thread of (121)
125 Traction bolt for (121)
126 Secured threaded pin
131 Guide sleeve, flange-like
132 Storage space bore
133 Locking bore
134 Screws for (131)
135 Tension pin
136 Main bore
137 Transverse bores
138 Actuating groove
139 Locking balls
140 Tension pin carrier plate
141 Spring mechanism
142 Helical compression springs, pre-tensioned
143 Support screws
150 Eccentric drive
151 Actuating shaft
152 Actuating pin
153 Actuating screw
155 Stop groove
156 Stop screw
161 Release position
162 Clamping position

What is claimed is:

1. A workpiece carrier (1), comprising:
a table adapter (10); and
a workpiece carrier base (40),
wherein the table adapter (10) is detachably mounted on a table (2) of a measuring instrument or a machine tool,
wherein support points (60, 80, 100) of three different types are arranged between the table adapter (10) and the workpiece carrier base (40),
wherein a first support point (60) of a first of the three different types of support points comprises a first rotary body (61) and three first balls (64-66), which the first rotary body (61) contacts in three first contact points (67-69), the center points of which form a triangle,
wherein a second support point (80) of a second of the three different types of support points comprises a second rotary body (81) and two second balls (85, 86), center points of the second balls (85, 86) together with second contact points (87, 88) located between the second balls (85, 86) and the second rotary body (81) forming a plane (93) that intersects an axis of rotation (82) of the second rotary body (81),
wherein a third support point (100) of a third of the three different types of support points comprises a first contact element (101) with a spatially curved first front side (102) and a second contact element (103) with a flat or spatially curved second front side (104), the first and the second front side (102, 104) being in contact with each other at a third contact point (105),
wherein the first rotary body (61), the second rotary body (81), and the first contact element (101) are arranged on either the workpiece carrier base (40) or on the table adapter (10), and
wherein the table adapter (10) and the workpiece carrier base (40) can be clamped against each other after mutual positioning by a clamping system (120).

2. The workpiece carrier (1) according to claim 1, wherein the first rotary body (61), the second rotary body (81), and the first contact element (101) are arranged on the workpiece carrier base (40).

3. The workpiece carrier (1) according to claim 1, comprising two third support points (100),
wherein a center (72) of the first contact points (67-69), a center (89) of the second contact point (87,88) and the third contact points (105) span a quadrilateral (108).

4. The workpiece carrier (1) according to claim 3,
wherein the quadrilateral (108) includes an area corresponding to at least 42% of a circular area, a radius of which is defined by a maximum radius of the workpiece carrier base (40).

5. The workpiece carrier (1) according to claim 1,
wherein the first rotary body (61) has an axis of rotation (74) that vertically intersects a plane spanned by the three first contact points (67-69).

6. The workpiece carrier (1) according to claim 5,
wherein the first rotary body (61) is a ball, a diameter of which corresponds to a diameter of the three first balls (64-66).

7. The workpiece carrier (1) according to claim 1,
wherein the second rotary body (81) is a cylinder roller, a diameter of which corresponds to a diameter of the two second balls (85, 86).

8. The workpiece carrier (1) according to claim 1,
wherein centers (72, 89) of the first support point (60) and the second support point (80) are located in a plane normal to a main center line (5) of the workpiece carrier with an imaginary connecting line intersecting the main center line (5).

9. The workpiece carrier (1) according to claim 1,
wherein the second contact element (103) is a cylindrical journal with a flat front surface (104), while the first contact element (101) is a cylindrical pin with spherically curved front surface (102).

10. The workpiece carrier (1) according to claim 1,
wherein the workpiece carrier base (40) has at least three pre-centering journals (56) arranged around a main center line (5), which, in each case with a clearance smaller than a radius of a circle (70), which is defined by the first contact points (67-69) of the first support point (60), fit into corresponding pre-centering recesses (17) of the table adapter (10), and
wherein one of the pre-centering journals (56) has a smaller distance to the main center line (5) than the other two.

11. The workpiece carrier (1) according to claim 1,
wherein the clamping system comprises on one side a tightening bolt (121) and on another side a pre-tensioned mechanical spring mechanism (141) with a spring-loaded tension pin (135) that can be locked to the tightening bolt (121),
wherein an eccentric drive (150) takes the tension pin (135) into a release position (161) or releases it for clamping.

12. The workpiece carrier (1) according to claim 1,
wherein the first support point (60), through contact of the rotary body (61) with the three first balls (64-66), blocks all three degrees of translational freedom for the rotary body (61) and allows the rotary body (61) to only move around its rotary body center of rotation with three degrees of swivel freedom.

13. The workpiece carrier (1) according to claim 1,
wherein the first support point (60) and the second support point (80) cooperate to block all translational movement of the workpiece carrier base (40) and allow for only one degree of swivel motion of the workpiece carrier base (40).

14. The workpiece carrier (1) according to claim 1,
wherein the first support point (60) comprises exactly three first balls (64-66), and
wherein the second support point (80) comprises exactly two second balls (85, 86).

\* \* \* \* \*